Figure 1:
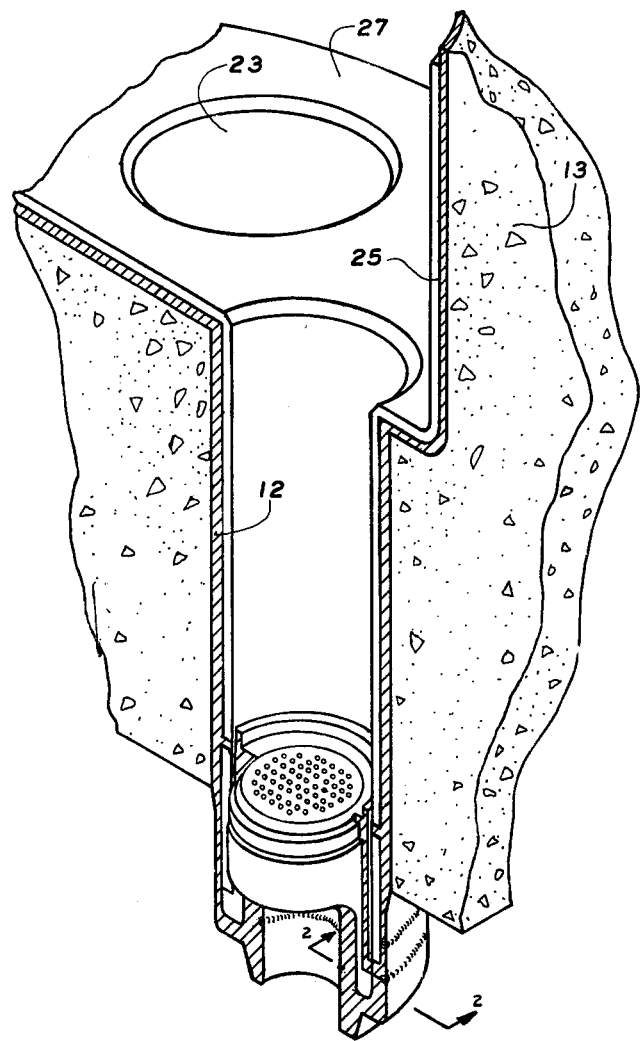

United States Patent [19]
Kube

[11] 4,035,232
[45] July 12, 1977

[54] CLOSURE SYSTEM

[75] Inventor: Leonard J. Kube, San Diego, Calif.

[73] Assignee: General Atomic Company, San Diego, Calif.

[21] Appl. No.: 496,104

[22] Filed: Aug. 9, 1974

[51] Int. Cl.² .......................................... G21C 9/00
[52] U.S. Cl. ................... 176/38; 176/60; 176/65; 220/3
[58] Field of Search .................. 176/38, 60, 65, 87; 220/3

[56] References Cited

U.S. PATENT DOCUMENTS

| | | | |
|---|---|---|---|
| 3,173,846 | 3/1965 | Chauvin et al. | 176/50 X |
| 3,327,892 | 6/1967 | Lloyd et al. | 220/3 X |
| 3,352,756 | 11/1967 | Lockett et al. | 176/40 |
| 3,379,616 | 4/1968 | Vitry | 176/65 X |
| 3,398,050 | 8/1968 | Yevick et al. | 176/87 X |
| 3,410,752 | 11/1968 | Dell | 176/87 X |
| 3,525,669 | 8/1970 | Germer | 176/87 X |
| 3,847,733 | 11/1974 | Ventre | 176/87 X |
| 3,883,392 | 5/1975 | Burylo et al. | 176/65 X |

Primary Examiner—Samuel W. Engle
Assistant Examiner—Peter A. Nelson
Attorney, Agent, or Firm—Fitch, Even, Tabin & Luedeka

[57] ABSTRACT

A gas-cooled nuclear reactor system is described having a pressure vessel with a penetration therein for accommodating a heat exchanger. A closure system is used in which a restrainer ring is positioned between a tube sheet and the interior of the pressure vessel to restrain movement of the tube sheet toward the interior of the pressure vessel.

5 Claims, 2 Drawing Figures

CLOSURE SYSTEM

This invention relates generally to gas-cooled nuclear reactor systems and, more particularly, to an improved closure system for a pressure vessel in such a system wherein a penetration is provided for accomodating a heat exchanger.

A promising design for a nuclear reactor system employes a gas such as helium or carbon dioxide as the primary reactor coolant. The entire primary system including the reactive core, primary coolant circulators, vapor generators and associated main primary coolant ducting, is enclosed within a single reactor vessel. The fact that external main primary coolant ducts are eliminated by enclosing the entire primary system in the reactor vessel avoids the possiblity of a sudden loss of primary coolant due to ducting failure. Where the reactor vessel is constructed of prestressed concrete, the need for additional elaborate biological shielding for enclosing the vapor generator and main primary coolant ducting is eliminated, since the reactor pressure vessel itself performs this function.

In a gas-cooled nuclear reactor system for producing steam for power purposes, the steam-water system frequently operates at a substantially higher pressure than the coolant gas. For example, where helium is used as the gas coolant, a satisfactory operating pressure may be of the order of 700 psi whereas the pressure in the initial part of the steam generation system (such as an economizer-evaporator and a superheater) may exceed 2,000 psi. Naturally, the inlet feed water pressure is kept slightly greater than the back pressure produced by the steam in order that a flow through the steam generator tubes may be maintained.

Ordinarily, a steam generator of the type described consists of a plurality of tubes terminating in a header mounted near the external terminus of the penetration in which the steam generator is mounted. Structural failure of the means which support the header can result in a rapid displacement of the header toward the interior of the pressure vessel. This may cause a rapid discharge of water or steam or both into the reactor vessel. If this occurs, the internal pressure of the reactor vessel may exceed its design limits with the introduction of the high pressure water or steam. In addition, graphite moderating structure frequently present in a nuclear reactor core may react with the water or steam at the high temperatures at which the reactor operates.

It is an object of the present invention to provide an improved gas-cooled nuclear reactor system.

Another object of the invention is to provide an improved closure system for a reactor pressure vessel in which a heat exchanger is accommodated in a penetration in the pressure vessel.

It is another object of the invention to provide a closure system for a nuclear reactor system having a pressure vessel with a penetration therein for accommodating a heat exchanger, which closure system protects against a rapid discharge of secondary coolant fluid into the reactor vessel.

Figure 2:
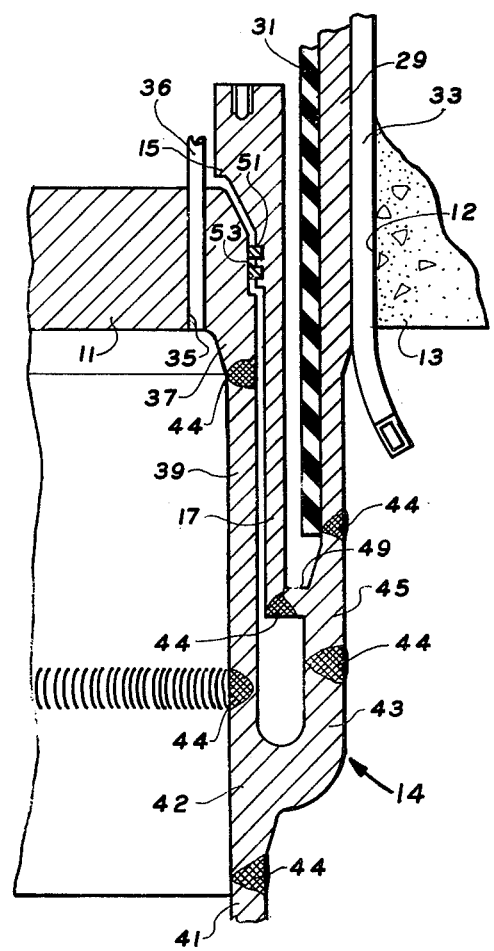

Other objects of the invention will become apparent to those skilled in the art from the following description, taken in connection with the accompanying drawings wherein:

FIG. 1 is a perspective view of a portion of a nuclear reactor system employing the invention; and FIG. 2 is a sectional view taken on a vertical plane through the line 2—2 of FIG. 1.

Very generally, the closure system of the invention comprises a tube sheet 11 mounted transversely of and aligned on the axis of a penetration 12 in a reactor vessel 13. Means 14 mount the tube sheet to the pressure vessel. A restrainer ring 15 is provided having an inner diameter less than the outer diameter of the tube sheet 11. Means 17 mount the restrainer ring to the pressure vessel in the penetration aligned on the axis of the penetration between the tube sheet and the interior of the pressure vessel to restrain movement of the tube sheet toward the interior of the pressure vessel.

Referring now more particularly to the drawings, the pressure vessel 13 of a typical gas-cooled nuclear reactor system is partially shown in perspective cut-away view. The vessel defines an interior cavity 21 in which the reactive core (not shown) of the nuclear reactor system may be mounted. Several penetrations in addition to the penetration 12, indicated generally at 23, are provided in the pressure vessel 13 for access to the cavity 21. Such penetrations may contain control rod drive systems, fuel element handling equipment, primary coolant circulators, or, as in the case of the penetration 12, a heat exchanger. The internal cavity is provided with a suitable metallic liner 25, which can be covered with a thermal barrier 27 to provide insulation.

The heat exchanger, not illustrated, is suitably mounted within the penetration 12 and a circulation flow of primary coolant is provided by suitable ducting, not shown, over the heat exchanger in the penetration.

The penetration is provided with a suitable metallic liner 29, and a layer of thermal insulation 31 extends along the surface of the liner. A plurality of cooling tubes 33 are disposed between the metallic liner 29 and the pressure vessel 13 to provide for cooling at the interface between the pressure vessel and the liner. The liner 29 projects downwardly from the lower surface of the pressure vessel.

The tube sheet 11, which is substantially circular in shape, extends transversely of the penetration 12 at the exterior terminus thereof, and is centered on the axis of the penetration. The tube sheet may, for example, be about 7-½ inches thick and is provided with a plurality of holes 35 therein through which tubes 36 from the unillustrated vapor generator pass. In the illustrated embodiment, the tube sheet 11 is provided with an annular flange 37 which extends downwardly. A thermal sleeve 39 is welded to the flange 37 to project a further distance downwardly from the bottom of the pressure vessel 13. The lower end of the thermal sleeve 39 is welded to extension sleeve 42 which is welded to the steam or feed water line 41. The line 41 provides the pressure for the secondary coolant fluid beneath the tube sheet 11 to cause the fluid to pass through the tubes 36. Fluid returning from the illustrated vapor generator may be routed in a suitable manner, not illustrated.

The sleeve 42 is provided with an annular upwardly projecting flange 43. The flange 43 is welded to the lower edge of a linear extension sleeve 45 which, in turn, is welded to the lower edge of the downwardly projecting liner 29. The weldment of the sleeve 45, the sleeve 42 and flange 43, the line 41, and the thermal sleeve 39 provides the means 41 for supporting the tube sheet 11 in position within the penetration 12. Welds are indicated in the regions 44.

Operating experience with tube sheets and various types of heat exchange equipment has shown that gross failure of the tube sheet itself is unlikely. This is because the tube sheet has built-in crack arrestors due to the close-packed array of penetrations in the tube sheet. Also, the tube sheet service temperatures are always above the nil ductility temperature of the materials, thus eliminating the possibility of brittle fracture.

Stress analysis indicates that the area of highest stress is at the joint between the tube sheet itself and its supporting structure. Thus, in the illustrated embodiment, gross failure is most likely to occur at the weld or adjoining structure between the flange 37 and the sleeve 39. Failure of the closure system at this point would result in a massive leak into the reactor cavity 21.

In order to prevent such a massive leak, the restraining ring 15 is provided. In the illustrated embodiment, the restraining ring 15 comprises an annular flange which extends inwardly from a restrainer cylinder 17. The restrainer cylinder 17 constitutes, in the illustrated in the pressure vessel penetration aligned on the axis thereof between the tube sheet 11 and the interior cavity 21 of the pressure vessel. The restrainer cylinder 17 is supported, at its lower end, by an annular flange 49 which projects inwardly from the liner extension 45. Any structural failure as above posulated will result in a slight movement of the tube sheet toward the interior of the pressure vessel. The restrainer ring 15, however, being smaller in inner diameter than the outer diameter of the tube sheet 11 engages the tube sheet and restrains it from further movement toward the interior of the pressure vessel. Moreover, the gap between the tube sheet 11 and the restrainer ring 15 closes to assist in limiting flow of secondary coolant into the interior of the pressure vessel.

As a positive means of limiting the flow of secondary coolant into the reactor vessel in the event of a failure, annular seal rings 51 and 53 are provided between the outer periphery of the tube sheet 11 and the inner surface of the restrainer cylinder 17.

The restrainer ring is sized to withstand impact loading from the tube sheet against the restrainer ring during failure. The seal rings are designed to withstand the maximum internal differential pressure likely to result between the pressure in the secondary coolant system and the pressure in the primary coolant system. Two seal rings are used to provide redundancy, however a single ring will adequately limit in-leakage.

The closure system of the invention provides an all welded boundary between the primary coolant system and the secondary coolant system in the reactor system. Moreover, all closure welds between the primary coolant and the surrounding environment are external to the pressure vessel to provide accessibility for installation and inspection. Access is readily available for leak checks and tube plugging in the tube sheet without the use of remote handling equipment. Moreover, monitoring instruments may be readily connected.

It may therefore be seen that the invention provides an improved closure system in a gas-cooled nuclear reactor system having a pressure vessel with a penetration therein for accommodating a heat exchanger. The closure system of the invention prevents excessive in-leak of secondary coolant to the primary coolant system of the reactor in the event of massive failure in the closure system.

Various modifications of the invention in addition to those shown and described herein will become apparent to those skilled in the art from the foregoing description and accompanying drawings. Such modifications are intended to fall within the scope of the appended claims.

What is claimed is:

1. In a gas-cooled nuclear reactor system having a pressure vessel with a metal-lined penetration therein for accommodating a heat exchanger, a closure system comprising, a tube sheet mounted transversely of the penetration aligned on the axis thereof for passing heat exchange fluid to the heat exchanger, a thermal sleeve extending from said tube sheet coaxial with the penetration, means for mounting said thermal sleeve to the pressure vessel, a failure protection cylinder and means for mounting same coaxial with said thermal sleeve between said thermal sleeve and the lining of the penetration, a restrainer ring defining an opening of lesser size than the periphery of said tube sheet, said restrainer ring being mounted to said failure protection cylinder in the penetration aligned on the axis thereof between said tube sheet and the interior of the pressure vessel to restrain movement of said tube sheet toward the interior of the pressure vessel.

2. A closure system according to claim 1 wherein said failure protection cylinder mounting means are located proximate the end of said failure protection cylinder opposite said restrainer ring.

3. A closure system according to claim 1 wherein said thermal sleeve mounting means are located toward the end of said thermal sleeve opposite said tube sheet.

4. A closure system according to claim 1 including flow restriction means between said failure protection cylinder and said thermal sleeve.

5. In a gas-cooled nuclear reactor system, having a pressure vessel with a metal-lined penetration therein for accommodating a heat exchanger, a closure system comprising, a substantially circular tube sheet mounted transversely of the penetration aligned on the axis thereof for passing heat exchange fluid to the heat exchanger, a thermal sleeve extending from said tube sheet coaxially with the penetration, means for mounting said thermal sleeve to the pressure vessel, a failure protection cylinder and means for mounting same coaxial with said thermal sleeve between said thermal sleeve and the liner of the penetration, said failure protection cylinder having an annular shoulder projecting radially inward therefrom adjacent said tube sheet on the side thereof toward the interior of the pressure vessel to form an opening of lesser diameter than the outer diameter of said tube sheet to provide a step between said tube sheet and the interior of the pressure vessel.

* * * * *

UNITED STATES PATENT AND TRADEMARK OFFICE
CERTIFICATE OF CORRECTION

PATENT NO. : 4,035,232
DATED : July 12, 1977
INVENTOR(S) : Leonard J. Kube

It is certified that error appears in the above-identified patent and that said Letters Patent are hereby corrected as shown below:

| | |
|---|---|
| Column 2, line 50 | "weleded" should be --welded--. |
| Column 2, line 62 | "linear" should be --liner--. |
| Column 2, line 66 | "means 41" should be --means 14--. |
| Column 3, following line 20 | Entire line deleted: After "illustrated" insert --embodiment, the means for mounting the restrainer ring--. |

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*